(12) United States Patent
Forcier

(10) Patent No.: US 8,915,501 B2
(45) Date of Patent: Dec. 23, 2014

(54) WHEEL-SKI SYSTEM FOR A VEHICLE

(71) Applicant: Scierie Bois St—Francois Inc., Saint-Francois-du-Lac (CA)

(72) Inventor: Mario Forcier, Saint-Francois-du-Lac (CA)

(73) Assignee: Scierie Bois St—Francois Inc., Saint-Francois-du Lac, Quebec (CA)

( * ) Notice: Subject to any disclaimer, the term of this patent is extended or adjusted under 35 U.S.C. 154(b) by 7 days.

(21) Appl. No.: 13/928,220

(22) Filed: Jun. 26, 2013

(65) Prior Publication Data

US 2014/0001718 A1 Jan. 2, 2014

Related U.S. Application Data

(60) Provisional application No. 61/664,974, filed on Jun. 27, 2012.

(51) Int. Cl.
*B62B 13/18* (2006.01)

(52) U.S. Cl.
CPC ................................ *B62B 13/18* (2013.01)
USPC ................................ 280/11; 280/9; 180/183

(58) Field of Classification Search
CPC .......... B26B 13/18; B26B 19/02; B26B 19/04
USPC ............ 280/7.14, 8, 9, 11; 180/183; 244/108
See application file for complete search history.

(56) References Cited

U.S. PATENT DOCUMENTS

| | | | | |
|---|---|---|---|---|
| 1,800,812 A | | 4/1931 | Arps | |
| 2,106,934 A | | 2/1938 | Saulnier | |
| 2,315,098 A | * | 3/1943 | Simpson et al. | 244/102 R |
| 2,433,173 A | * | 12/1947 | Tucker | 280/11 |
| 2,532,611 A | | 12/1950 | Ditter | |
| 2,683,608 A | * | 7/1954 | Matheson | 280/9 |
| 2,864,624 A | * | 12/1958 | Dreyer et al. | 280/11 |
| 2,925,970 A | * | 2/1960 | Heaslip | 244/108 |
| 2,977,073 A | * | 3/1961 | Ditter et al. | 244/108 |
| 3,128,065 A | * | 4/1964 | Landes | 244/108 |
| 3,477,734 A | * | 11/1969 | Albertson | 280/11 |
| 3,570,617 A | * | 3/1971 | O'Day | 180/184 |
| 3,901,525 A | * | 8/1975 | O'Brien et al. | 280/14 |
| 4,026,502 A | * | 5/1977 | Masclet | 244/108 |
| 4,069,883 A | | 1/1978 | Cousineau | |
| 4,313,516 A | | 2/1982 | Terry | |
| 4,390,151 A | * | 6/1983 | Schneider | 244/108 |
| 4,616,724 A | * | 10/1986 | Lemke | 180/6.48 |

(Continued)

FOREIGN PATENT DOCUMENTS

| CA | 1143353 A1 | 3/1983 |
|---|---|---|
| CA | 2442606 A1 | 10/2002 |

(Continued)

*Primary Examiner* — Katy M Ebner
(74) *Attorney, Agent, or Firm* — Ipaxio S.E.N.C.

(57) ABSTRACT

The wheel-ski system is for use with a vehicle adapted for travel on road and snow-covered surfaces. The system has a ski-engaging travel mode and a wheel-engaging travel mode. It includes an elongated ski, a supporting leg pivotally coupled to the vehicle, a wheel, an actuator mounted between a back plate and a first lever arm, and a positioning device for positioning a wheel-supporting axle into an upper position when the supporting leg is in a first position, and positioning the wheel-supporting axle into a bottom position when the supporting leg is in a second position.

20 Claims, 11 Drawing Sheets

(56) References Cited

U.S. PATENT DOCUMENTS

| | | | |
|---|---|---|---|
| 4,719,983 A * | 1/1988 | Bruzzone | 180/184 |
| 5,850,990 A | 12/1998 | Gevers | |
| 6,098,927 A | 8/2000 | Gevers | |
| 6,527,282 B2 * | 3/2003 | Ouellette | 280/7.14 |
| 6,824,147 B2 * | 11/2004 | Ouellette | 280/7.14 |
| 6,889,987 B2 * | 5/2005 | Ouellette | 280/9 |
| 6,932,359 B2 * | 8/2005 | Ouellette | 280/7.14 |
| 7,290,774 B2 * | 11/2007 | Despres | 280/28 |
| 7,500,678 B1 * | 3/2009 | Whiting | 280/9 |
| 8,191,905 B2 | 6/2012 | Beaudoin | |
| 8,505,929 B2 * | 8/2013 | Lachance | 280/9 |
| 2006/0151983 A1 | 7/2006 | Despres | |
| 2010/0201087 A1 | 8/2010 | Beaudoin | |
| 2012/0222908 A1 | 9/2012 | Mangum | |

FOREIGN PATENT DOCUMENTS

| | | |
|---|---|---|
| GB | 533076 A1 | 2/1941 |
| GB | 790243 A1 | 2/1958 |
| GB | 895022 A1 | 4/1962 |

\* cited by examiner

WHEEL-SKI SYSTEM FOR A VEHICLE

CROSS-REFERENCE TO RELATED APPLICATION

The present case claims the benefit of U.S. Patent Application No. 61/664,974 filed on 27 Jun. 2012, the content of which is hereby incorporated by reference in its entirety.

TECHNICAL FIELD

The technical field relates generally to wheel-ski systems for vehicles.

BACKGROUND

Some vehicles are designed to travel on surfaces covered with snow and/or ice. These vehicles, for instance snowmobiles, often have at least one ski at the front. Most of them have two spaced-apart front skis. Skis are working much better than wheels on snow or ice-covered surfaces. However, on a surface that is not covered with snow or ice, they are not. Vehicles with skis are often very difficult to steer on hard or relatively hard surfaces such paved roads or the like. Thus, whenever possible, drivers of vehicles with skis avoid travelling outside surfaces covered with snow and/or ice. When this is not possible, they minimize the travel distance and speed on these other surfaces.

Many vehicles are designed to travel on paved roads using wheels. Automobiles are examples of such vehicles. They offer a level of comfort that is not found in the vast majority of the vehicles designed for snow-covered and/or ice-covered surfaces.

Converting a road vehicle having wheels into a vehicle with skis at the front was done in the past. However, replacing some of the wheels of a vehicle with skis essentially confines the converted vehicles to snow-covered and/or ice-covered surfaces, just like other vehicles designed for such surfaces.

Some arrangements have been suggested in the past where the driver of a vehicle can select between using either a ski or a wheel, depending on where the vehicle is. Wheel-ski systems are devices where both skis and wheels are available to the driver. Yet, wheel-ski systems have also been suggested for use on airplanes. See for instance U.S. Pat. No. 2,106,934 (Saulnier) of 1938. Other wheel-ski systems have been suggested for use on snowmobiles. See for instance U.S. Patent Publication 2006/0151983 (Despres) of 2006.

While the general idea of using wheel-ski systems on vehicles have resulted in a number of different constructions, none has been found completely satisfactory and accordingly, room for improvements still exists in this technical field.

SUMMARY

In one aspect, there is provided a wheel-ski system for a vehicle adapted for travel in a forward travel direction on road and snow-covered surfaces, the system having a ski-engaging travel mode and a wheel-engaging travel mode, the system including: an elongated ski having a ground-engageable undersurface, the ski extending in a longitudinal direction, which longitudinal direction is substantially parallel to the forward travel direction; a back plate to be rigidly connected to the vehicle; a supporting leg having a top end and a bottom end, the top end of the supporting leg to be pivotally coupled to the vehicle about a first transversal pivot axis that is substantially orthogonal to the longitudinal direction, the supporting leg being pivotable about the first transversal pivot axis between a first position and a second position, the first position corresponding to the ski-engaging travel mode and the second position corresponding to the wheel-engaging travel mode, the bottom end of the supporting leg being pivotally coupled to the ski about a second transversal pivot axis that is substantially orthogonal to the longitudinal direction; a wheel having a ground-engageable outer surface; a first lever arm having opposite first and second ends, the first end of the first lever arm being in a torque-transmitting engagement with the supporting leg; an actuator mounted between the back plate and the first lever arm, the actuator at least generating a force urging the supporting leg to pivot towards its first position when the system is in the ski-engaging travel mode; a pair of second lever arms having opposite first and second ends, the first ends of the second lever arms being pivotally coupled to the supporting leg about a third transversal pivot axis that is substantially orthogonal to the longitudinal direction, the third transversal pivot axis being located above the ski and on a front side of the supporting leg with reference to the forward travel direction; a wheel-supporting axle around which the wheel is mounted for rotation, the wheel-supporting axle extending transversally between the second ends of the second lever arms and along a fourth transversal pivot axis that is substantially orthogonal to the longitudinal direction, the wheel-supporting axle being movable between an upper position and a bottom position, the upper position corresponding to the ski-engaging travel mode and the bottom position corresponding to the wheel-engaging travel mode; and a positioning device mounted between the first lever arm and one of the second lever arms, the positioning device positioning the wheel-supporting axle into the upper position when the supporting leg is in its first position, and positioning the wheel-supporting axle into the bottom position when the supporting leg is in its second position.

Further details on the various aspects and features of the proposed concept will be apparent from the following detailed description and the appended figures.

DETAILED DESCRIPTION

Figure 1:
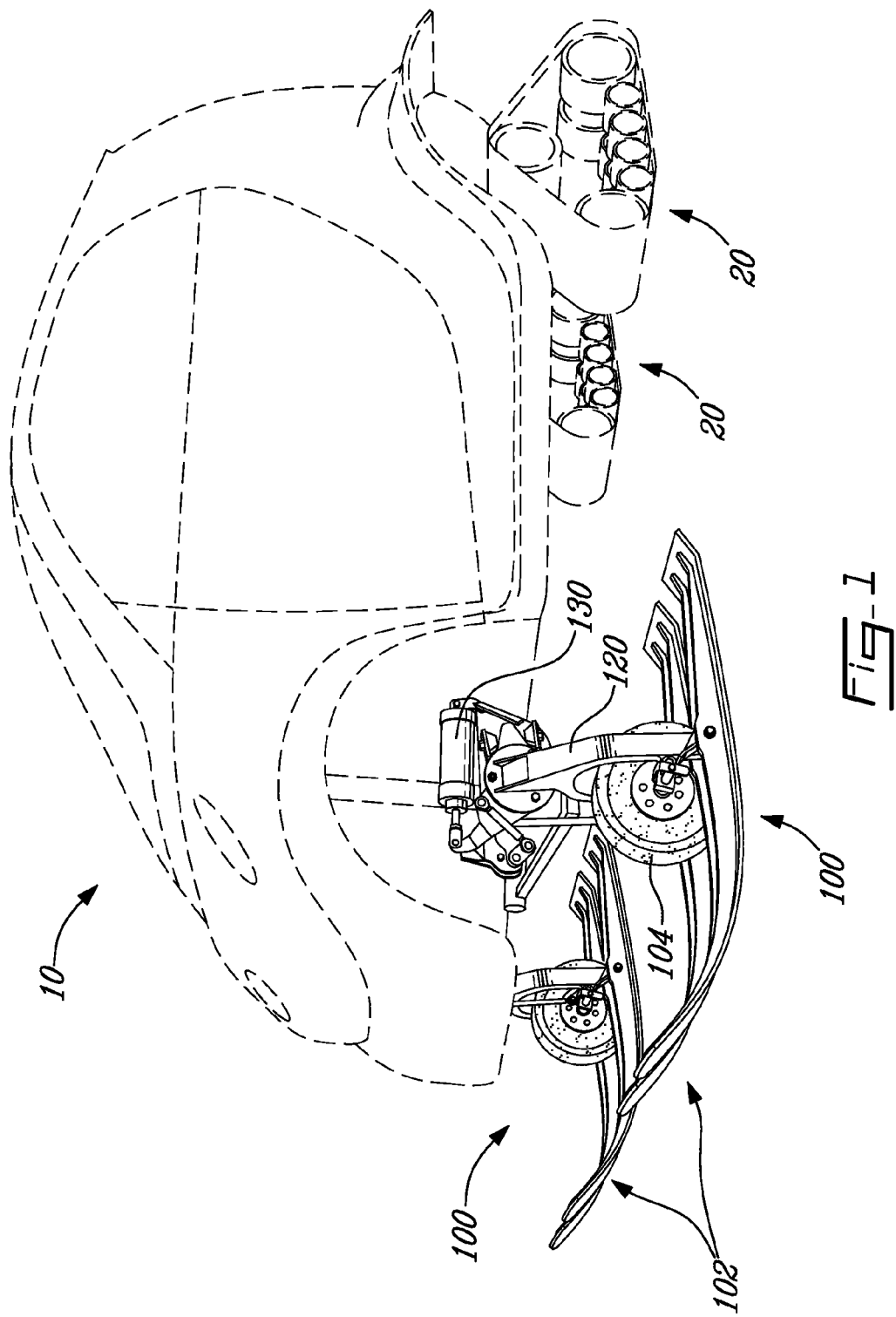
FIG. 1 is an isometric view illustrating an example of a vehicle having an example of a wheel-ski system as suggested herein on each side, the wheel-ski systems being shown in a ski-engaging travel mode.

FIG. 1 is an isometric view illustrating an example of a vehicle 10 having an example of a wheel-ski system 100 as suggested herein on each side. One wheel-ski system 100 is provided on the left side of the vehicle 10 and the other one is provided on the right side of the vehicle 10. The right wheel-ski system 100 is essentially a mirror image of the left wheel-ski system 100 in the illustrated example. Variants are possible.

The illustrated vehicle 10 is a small automobile originally built for use as a four wheel passenger car. The vehicle 10 was converted later into a multi-terrain vehicle. This conversion included replacing its two original front wheels with the two wheel-ski systems 100. Its two original rear driving wheels were also replaced with compact track systems 20, one at the right and one at the left. The track systems 20 are better suited for use on snow or ice. Variants are possible as well.

Converting existing automobiles or the like into a multi-terrain vehicle can be very advantageous since there is a very wide range of models available on the market. Such multi-terrain vehicles can then be used as emergency vehicles, transport vehicles for maintenance technicians, etc. Alternatively, one can provide one or more wheel-ski systems 100 on a newly-designed vehicle or on a vehicle that was not previously an automobile. Many other variants are possible as well. For instance, using the system 100 on an airplane is possible.

The wheel-ski systems 100 will be provided at the front of vehicles in a majority of implementations. Some will use them at the rear. Most of the vehicles will also use two spaced-apart wheel-ski systems 100, one at the right and one at the left. Nevertheless, some vehicles may only need one while others may use more than two.

It should be noted at this point that although reference will often be made in the following text to a single wheel-ski system 100, this does not exclude the fact that the same vehicle may have two or even more wheel-ski systems 100.

Figure 2:
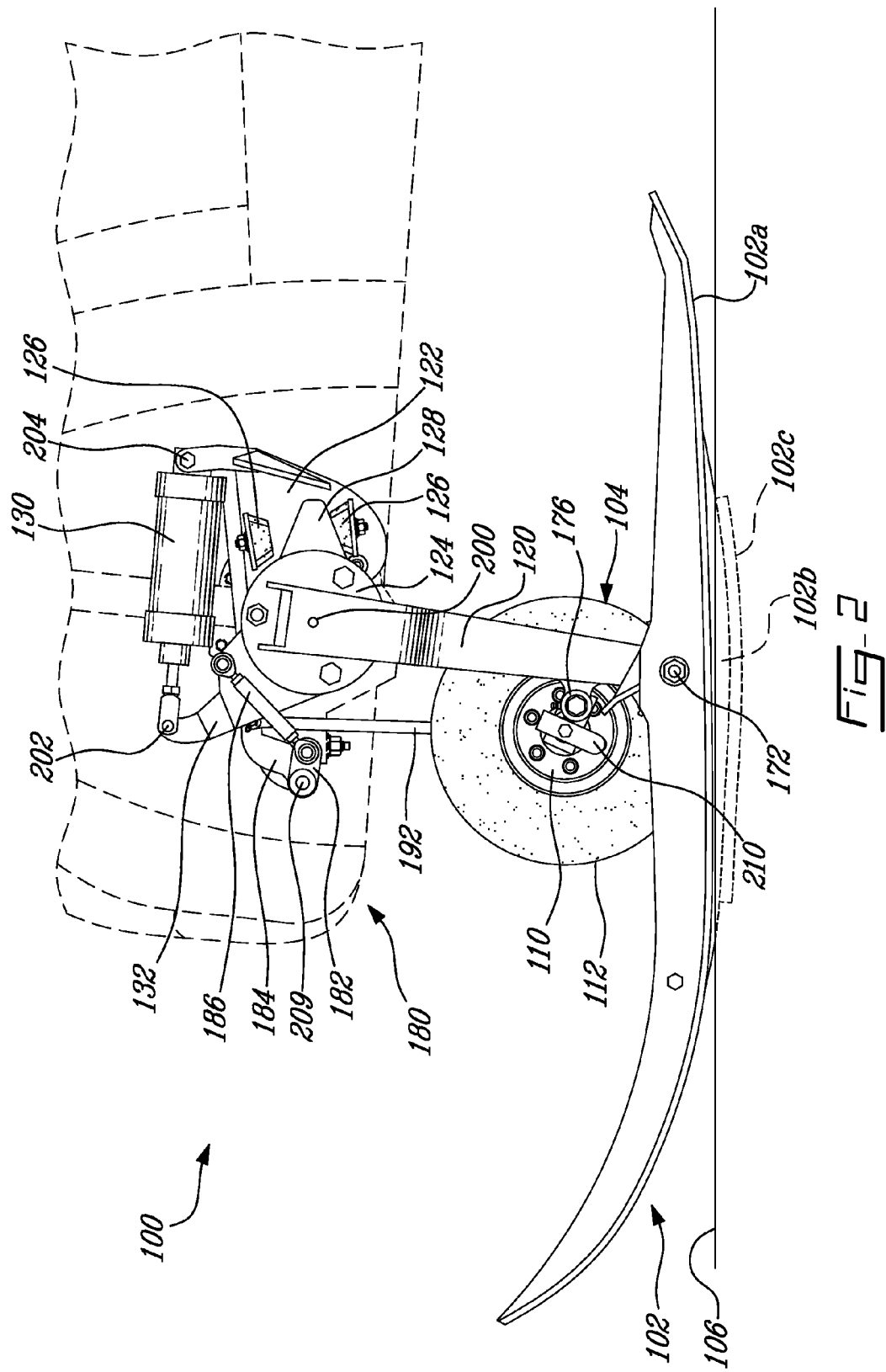
FIG. 2 is a left side view of the left wheel-ski system shown in FIG. 1.

As its name indicates, the wheel-ski system 100 includes both a ski 102 and a wheel 104. When the ski 102 supports all or most of the weight of vehicle 10 over the ground, this will be referred to as the ski-engaging travel mode. This mode is shown for instance in FIGS. 1 and 2. FIG. 2 is a left side view of the left wheel-ski system 100 shown in FIG. 1.

Figure 3:
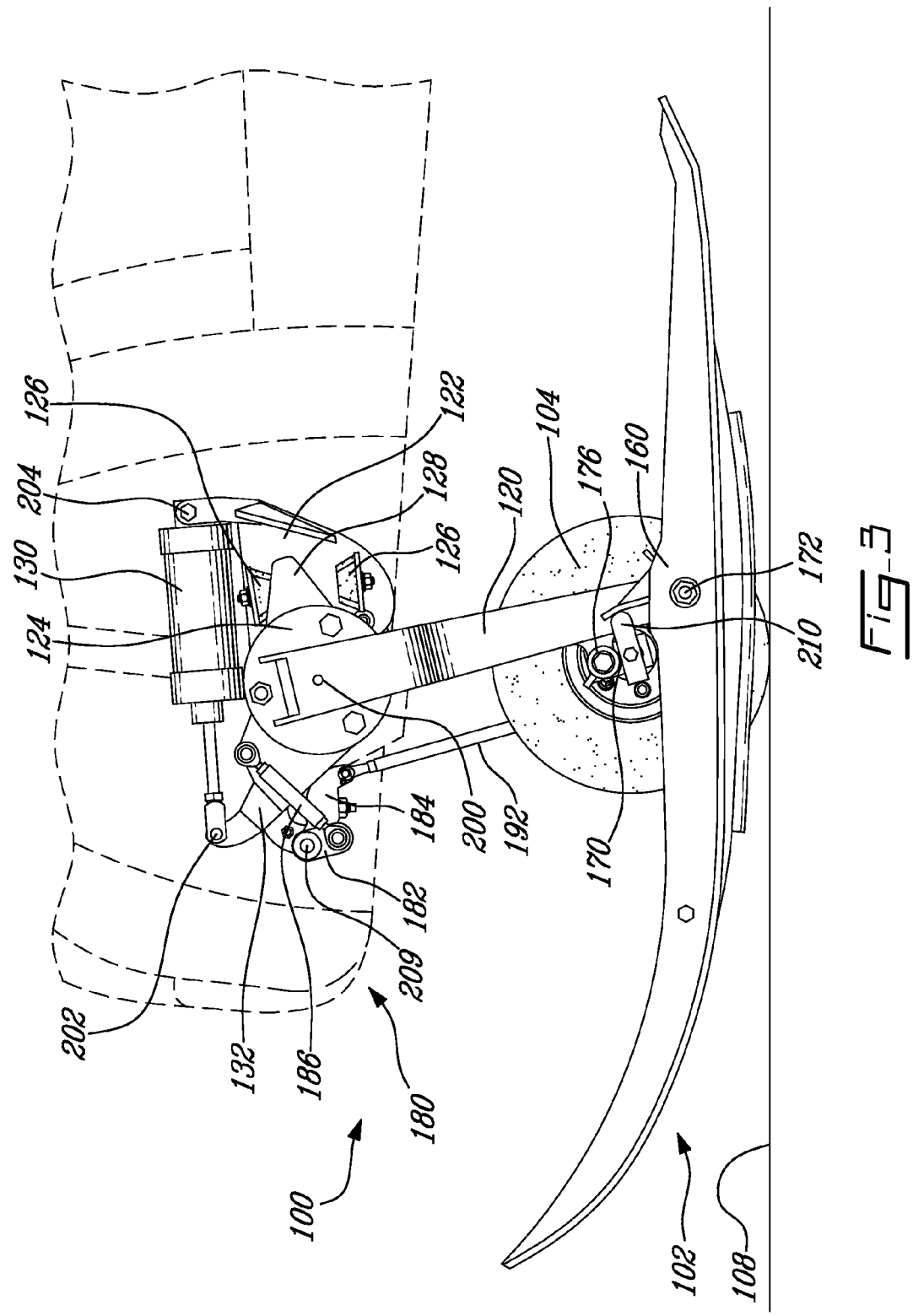
FIG. 3 is a view similar to FIG. 2 but with the wheel-ski system being shown in a wheel-engaging travel mode.

When the wheel 104 supports all or most the weight of the vehicle 10 over the ground, this will be referred to as the wheel-engaging travel mode. This mode is shown for instance in FIG. 3. FIG. 3 is a view similar to FIG. 2 but the wheel-ski system 100 is set in the wheel-engaging travel mode.

The ski 102 has an elongated shape and a ground-engageable undersurface 102a that can slide on a surface 106 covered with snow or ice. The ski 102 extends in a longitudinal direction, which longitudinal direction is substantially parallel to the forward travel direction of the vehicle 10.

It should be noted that in the context of the present disclosure, and for the sake of simplicity, references to a snow-covered surface 106 are also meant to include surfaces covered with ice and surfaces covered with a mix of snow and ice.

The illustrated ski 102 has an elongated base portion 102b projecting downwardly at the center and an elongated runner shoe 102c (also sometimes called a "wear bar") removably attached under the base portion 102b, for instance using nuts. The base portion 102b and the runner shoe 102c increase steering control by cutting into the snow or ice. The runner shoe 102c also mitigates wear of the ski 102. Variants are possible. For instance, the ski 102 can be shaped differently and can include different or additional features, such as handles or the like.

The ski 102 of the illustrated example is double sided, i.e. it includes interior and exterior ski blades 102' that are parallel to and spaced apart from one another. Nevertheless, they both form the ski 102. The two ski blades 102' can pivot independently from one another or they can be made integral with one another, depending on the implementation. They create an intervening space around the wheel 104. This way, the wheel 104 can be moved up and down between the ski blades 102'.

As best shown in FIG. 2, the wheel 104 of the illustrated example includes a rim 110 around which is mounted a gas-inflated tire 112, for instance a tire made of a rubber-like material and inflated with pressurized air. The wheel 104 has a ground-engageable outer surface (i.e. tread) designed to roll on the ground, for instance on a road surface 108 or the like, as schematically depicted in FIG. 3. The exact size and construction of the wheel 104 can vary from one implementation to another. However, if the wheel-ski system 100 replaces an existing wheel of a vehicle, for instance the wheel of a converted automobile like in the illustrated example, the wheel 104 will often be smaller than the original one. Variants are possible as well.

It should be noted that in the context of the present disclosure, and for the sake of simplicity, references to a road surface 108 are meant to include paved surfaces and other hard or relatively hard surfaces on which a wheel is better suited than a ski.

In the ski-engaging travel mode, as shown for instance in FIGS. 1 and 2, the wheel 104 is set in an upper stowed position and its bottom remains a few centimeters above the surface 106. In the wheel-engaging travel mode, as shown for instance in FIG. 3, the ski 102 is set in an upper stowed position and the runner shoe 102c remains a few centimeters above the road surface 108.

The wheel-ski system 100 includes a supporting leg 120 made of a rigid material. The top end of the supporting leg 120 is pivotally coupled to the vehicle 10 and can pivot around a first transversal pivot axis 200 that is substantially orthogonal to the longitudinal direction. In the illustrated example, the top end of the supporting leg 120 includes a disk-shaped portion 124 that is bolted or otherwise rigidly attached a pivotable supporting plate located on its interior side. The top end of the supporting leg 120 is configured and disposed to be mounted to a corresponding steering knuckle arm of the vehicle 10. The first transversal pivot axis 200 is located where the original wheel spindle was. Thus, the supporting leg 120 is attached to the left-side steering knuckle arm of the vehicle 10. During the conversion of the vehicle 10, the original front brake and the corresponding rotor were removed. Having the wheel-ski system 100 attached to the steering knuckle arm allows the wheel-ski system 100 to be steered in order to turn the vehicle 10 right or left, just as with any other vehicle. Nevertheless, other configurations and arrangements are also possible.

The wheel-ski system 100 further includes a back plate 122 that is configured and disposed to be mounted to a corresponding steering knuckle arm of the vehicle 10. For instance, the back plate 122 can be bolted or otherwise rigidly attached to the steering knuckle arm. The back plate 122 is not pivoting about the first transversal pivot axis 200 but it follows the movements of the steering knuckle arm. The back plate 122 is located on the interior side of the pivotable supporting plate to which the disk-shaped portion 124 of the supporting leg 120 is attached. The pivotable supporting plate can be connected to the back plate 122 once the back plate 122 is attached to the steering knuckle arm.

A pair of spaced-apart stopper pads 126 is provided to limit the pivot movement of the supporting leg 120. Each stopper pad 126 includes a rigid portion welded or otherwise rigidly attached to the back plate 122, and a resilient portion made for instance of rubber or the like. The resilient portion is designed to be engaged by a side lever 128 that is part of the pivotable supporting plate. The resilient portion of the stopper pads 126 can absorb shocks. Variants are possible.

The wheel-ski system 100 includes an actuator 130 mounted between the back plate 122 and a first lever arm 132 that is in a torque-transmitting engagement with the supporting leg 120. In the illustrated example, the first lever arm 132 is made integral with and radially projecting from the top end of the supporting leg 120. Variants are possible as well.

Still, the end of the stem of the actuator 130 is pivotally coupled to the first lever arm 132 at 202. The opposite end of the actuator 130 is pivotally coupled to the back plate 122 at 204. As can be seen when comparing FIGS. 2 and 3, the configuration of the various parts causes the supporting leg 120 to rotate around the first transversal pivot axis 200 when the actuator 130 is operated.

The ski 102 is pivotally coupled to the bottom end of the supporting leg 120 about a second transversal pivot axis that is substantially orthogonal to the longitudinal direction. This allows the ski 102 to pivot so as to follow the snow-covered surface 106 when the vehicle 10 is in motion. The supporting leg 120 of the illustrated example is fork-shaped, i.e. having an inverted "Y" shape. The part of the supporting leg 120 below its top end thus forms two side members 120' (see FIGS. 7 and 8). The side members 120' are attached together at their top ends but the side members 120' are spaced apart from one another below the attachment point to create an intervening space for the wheel 104. Each ski blade 102' is pivotally coupled to the bottom end of a corresponding side member 120' using a corresponding bushing assembly 172. Many variants are also possible.

The illustrated actuator 130 is remotely operated by the driver of the vehicle 10 to select between the wheel-engaging travel mode and the ski-engaging travel mode. This can be done by issuing a corresponding command signal, for instance by pressing a switch or moving a lever from inside the vehicle 10. Variants are possible as well.

Figure 4:
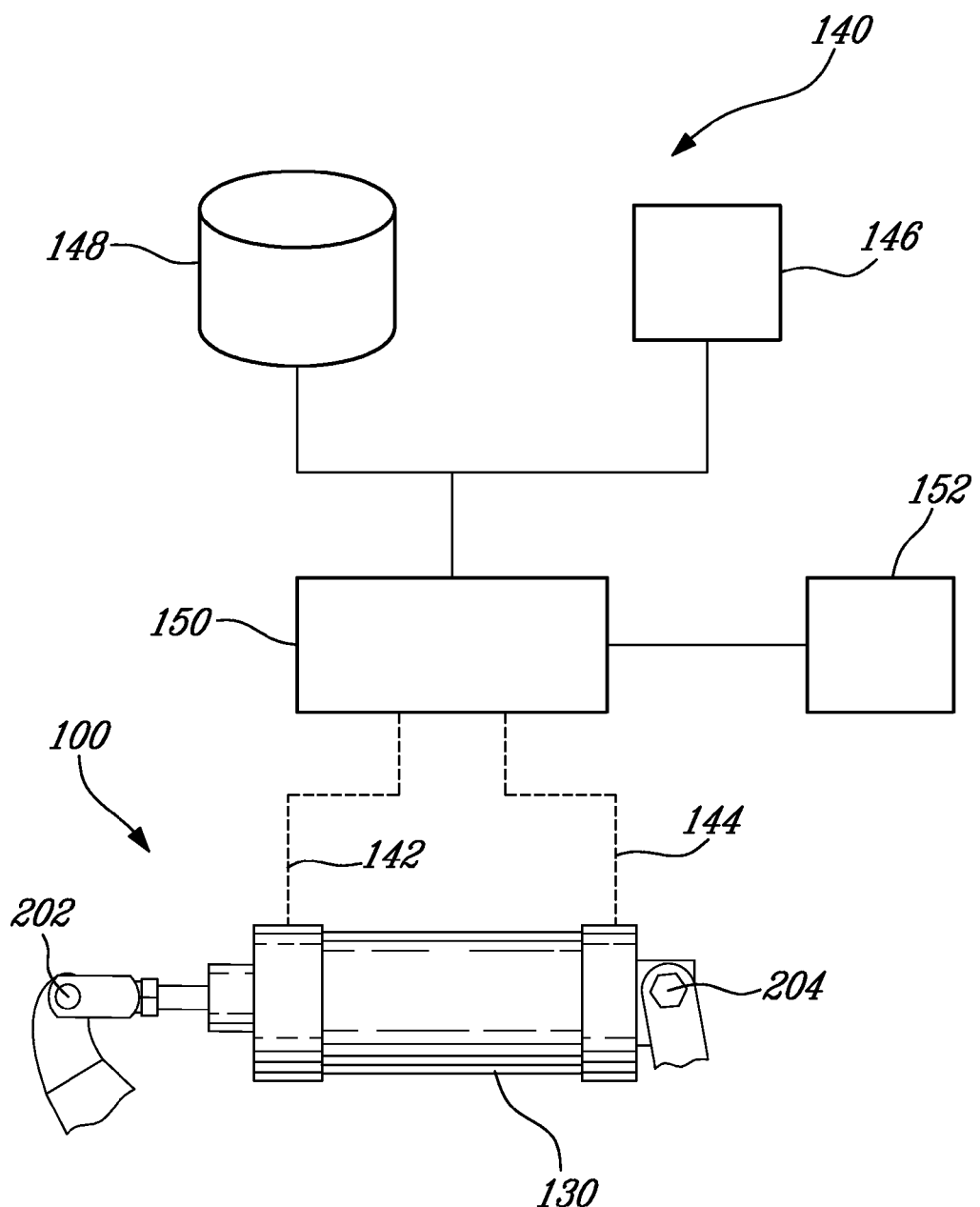
FIG. 4 is a semi-schematic view of the pneumatic actuator and the pneumatic system of the example shown in FIG. 1.

The actuator 130 of the illustrated example is a pneumatic actuator. It is connected to a pneumatic system 140, as schematically depicted in FIG. 4. FIG. 4 is a semi-schematic view of the pneumatic actuator 130 and the pneumatic system 140 of the example shown in FIG. 1. The same pneumatic system 140 can be used for both the right and left wheel-ski systems 100, if desired. The pneumatic system 140 will generally be located somewhere on the chassis of the vehicle 10 and will be connected to the pneumatic actuator 130 using two flexible lines 142, 144 or the like. Providing all or some of the parts of the pneumatic system 140 on the steering knuckle arm still remains possible. Other variants are possible as well.

The pneumatic system 140 illustrated in FIG. 4 includes a source of pressurized air 146, for instance an air compressor, an air tank 148 and a control valve 150 receiving commands from a control device 152 operated by the driver, for instance using levers and/or buttons. The control device 152 can be located inside the vehicle 10. The exact construction of the pneumatic system 140 and specific parts thereof can vary from one implementation to another.

The illustrated pneumatic actuator 130 has a double-acting function, meaning that the piston inside the cylinder of the actuator 130 can be pressurized on both sides using the pressurized air from the pneumatic system 140. The double-acting pneumatic actuator 130 is designed to absorb shocks when the vehicle 10 is in motion, particularly in the ski-engaging travel mode. The pneumatic actuator 130 will work in addition to the existing suspension of the vehicle 10. As shown in FIG. 2, the pneumatic actuator 130 is not entirely retracted in the ski-engaging travel mode and the piston inside the cylinder of the pneumatic actuator 130 can still move in both directions. The stopper pads 126 limit the angular movements of the supporting leg 120, as aforesaid. Nevertheless, variants are possible as well.

The pneumatic system 140 can also be designed to provide different pressure settings for the pressure inside the actuator 130. The driver can then select between, for instance, a firm suspension and a softer one, depending on the surface conditions and the desired comfort level.

Still, one can use an actuator that is not pneumatic, for instance a hydraulic actuator or a mechanical actuator. When a hydraulic actuator is provided, one can use one or more gas accumulators on the pressurized oil circuits to absorb shocks. A mechanical actuator can include a screw or the like and/or a spring. Many other variants are also possible.

Figure 5:
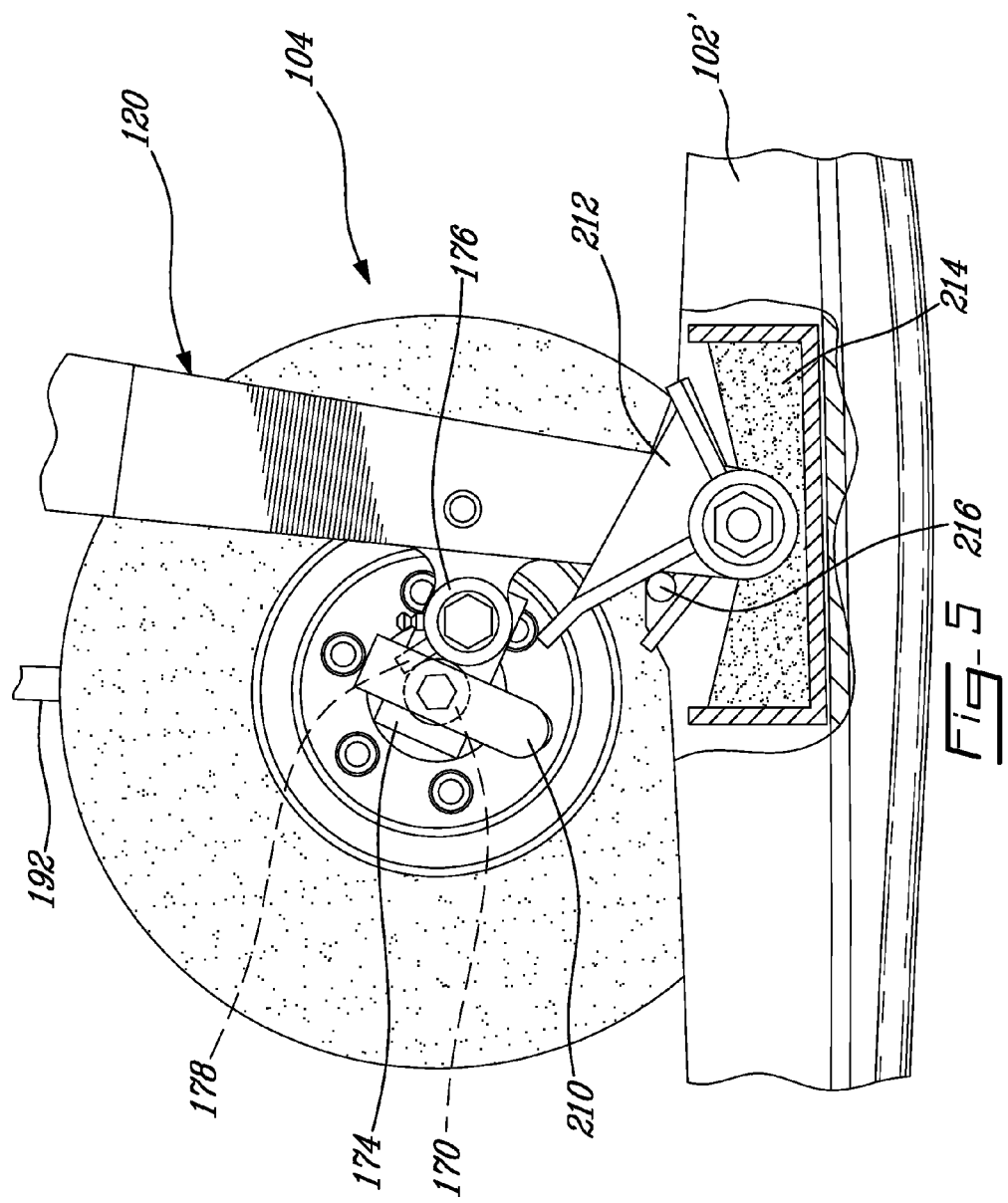
FIG. 5 is an enlarged and partially cut-away left side view of the bottom portion of the left wheel-ski system shown in FIG. 1.
Figure 6:
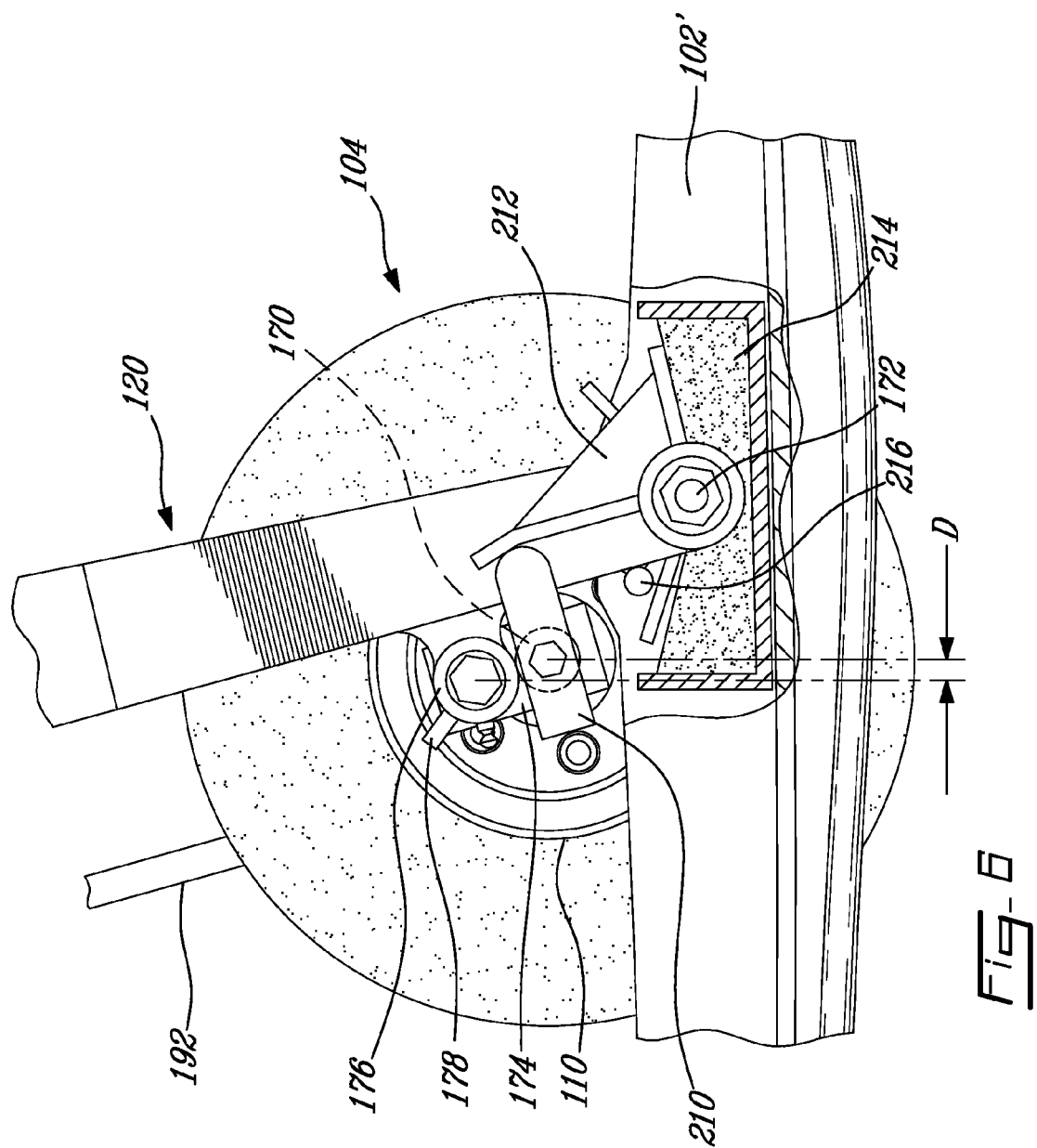
FIG. 6 is a view similar to FIG. 5 but with the wheel-ski system being shown in the wheel-engaging travel mode.

FIG. 5 is an enlarged and partially cut-away left side view of the bottom portion of the left wheel-ski system 100 shown in FIG. 1. FIG. 6 is a view similar to FIG. 5 but with the wheel-ski system 100 being shown in the wheel-engaging travel mode.

Figure 7:
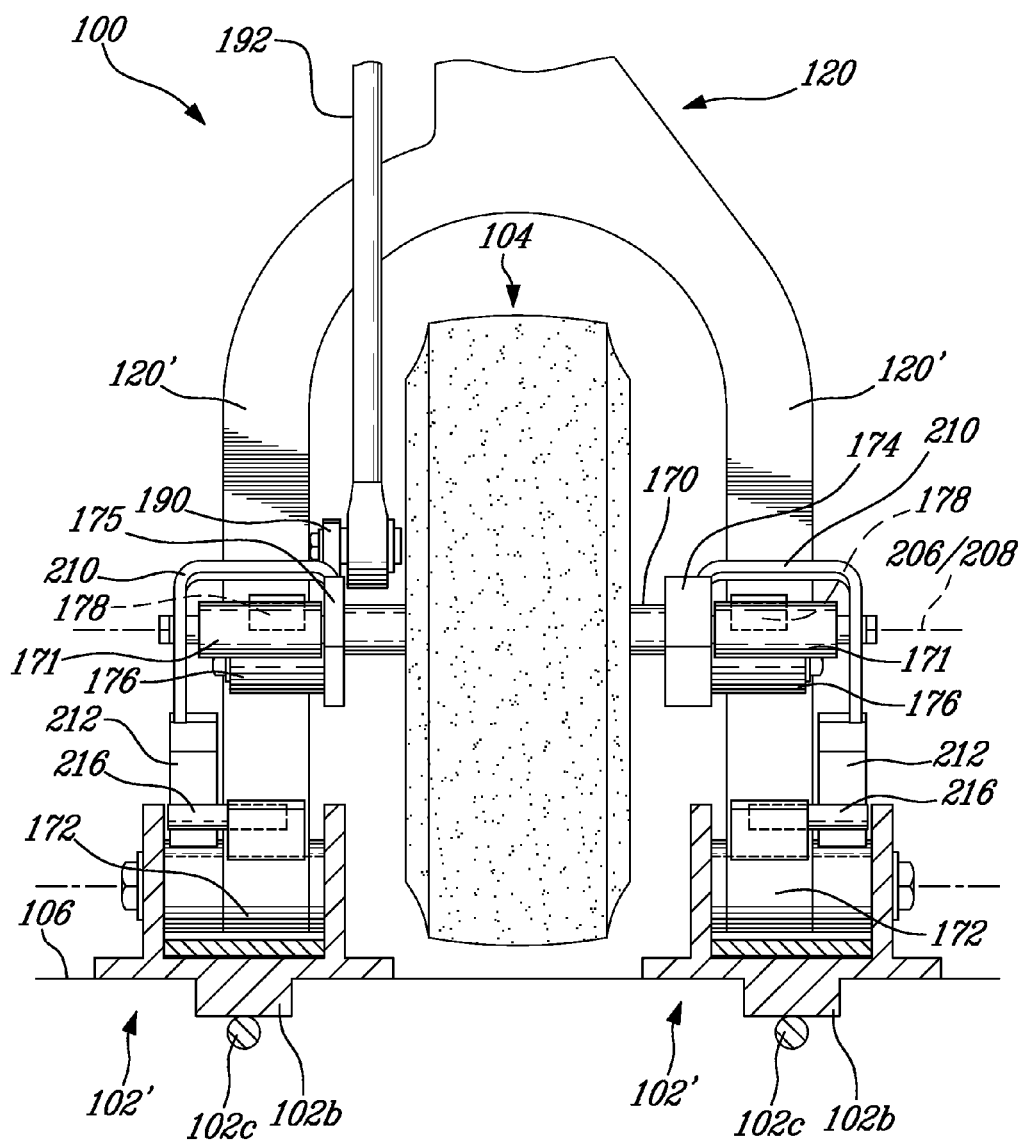
FIG. 7 is an enlarged and partially cross-sectional front view of the bottom portion of the left wheel-ski system shown in FIG. 1.
Figure 8:
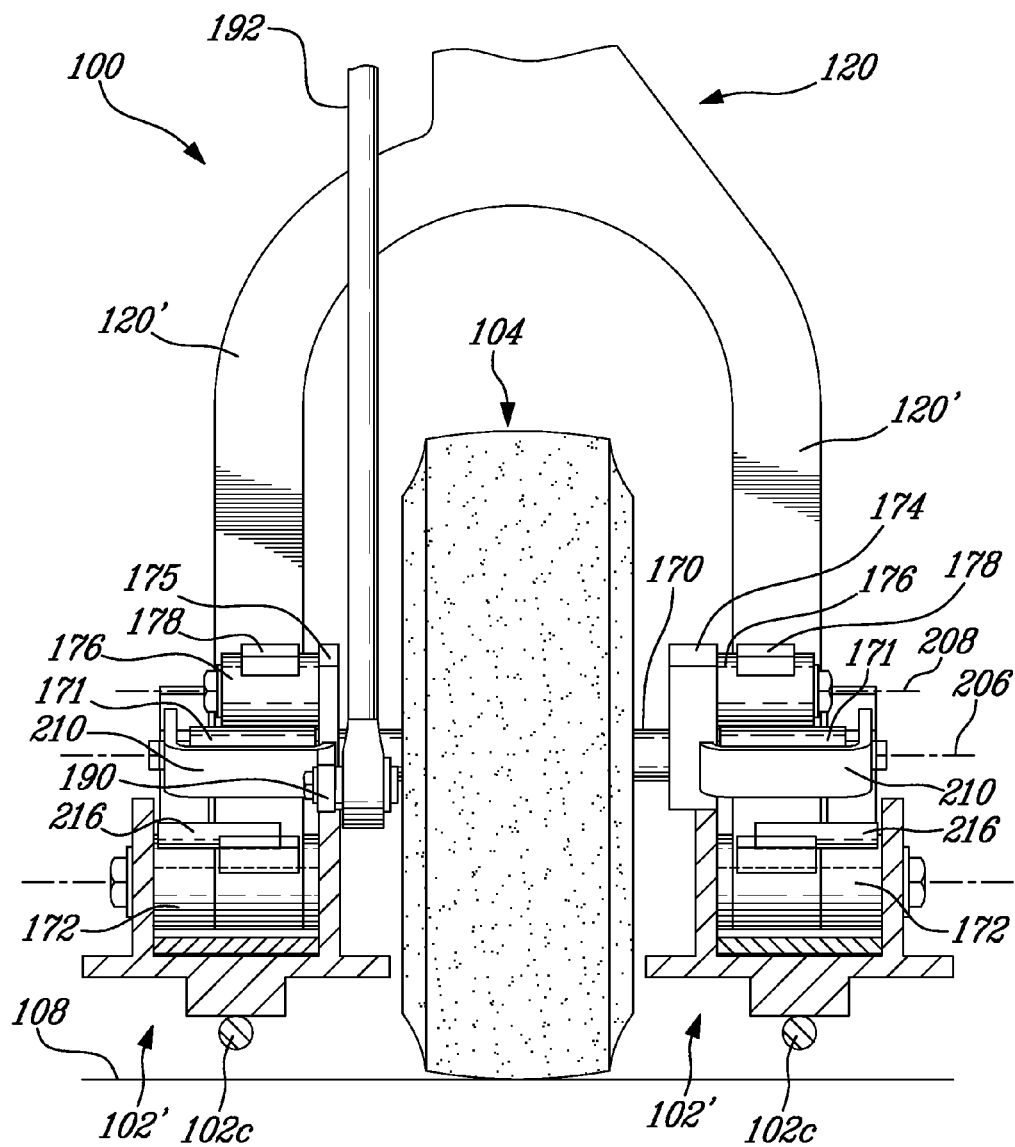
FIG. 8 is a view similar to FIG. 7 but with the wheel-ski system being shown in the wheel-engaging travel mode.

The wheel 104 is mounted for rotation around a substantially horizontal wheel-supporting axle 170, for instance using one or more bearings or the like provided between the rim 110 (FIG. 2) and the axle 170. The axle 170 extends along a transversal pivot axis 206 that is substantially orthogonal to the longitudinal direction. The axle 170 of the illustrated example is longer than the width of the wheel 104 on both sides, as shown in FIGS. 7 and 8. FIG. 7 is an enlarged and partially cross-sectional front view of the bottom portion of the left wheel-ski system 100 shown in FIG. 1. FIG. 8 is a view similar to FIG. 7 but with the wheel-ski system 100 being shown in the wheel-engaging travel mode.

The wheel 104 is operatively connected to the supporting leg 120 using two second lever arms 174, 175. The second lever arm 174 is on the exterior side of the wheel 104 and the second lever arm 175 is on the interior side thereof. Each second lever arm 174, 175 has opposite first and second ends. Their first end is pivotally coupled to the supporting leg 120 at a location that is above the ski 102. In the illustrated example, this location is a bearing 176 having its outer casing welded or otherwise rigidly connected to the front side of the supporting leg 120. Two bearings 176 are provided, one for each side member 120' of the supporting leg 120. The first end of each second lever arm 174, 175 includes a side peg or the like extending inside the corresponding bearings 176. The second lever arm 174, 175 can thus be pivoted in a substantially vertical plane around a transversal pivot axis 208 that is substantially orthogonal to the longitudinal direction.

The axle 170 is connected, on both sides of the wheel 104, to the second end of the second lever arms 174, 175. It can be welded or it can be pivotally coupled, using for instance a bearing. The axle 170 is movable between an upper position and a bottom position. The upper position of the axle 170 is shown for instance in FIG. 5 and its bottom position in shown for instance in FIG. 6.

In the illustrated example, the axle 170 is directly or indirectly in engagement with a circular outer front surface of the corresponding casings of the bearings 176. Thus, the axle 170 rolls over the outer surfaces of the bearings 176 when the position of the wheel 104 is changed. As shown in FIGS. 7 and 8, the opposite ends of the illustrated axle 170 include a corresponding roller 171. The two rollers 171 are pivotally connected to the main portion of the axle 170. A stopper 178 is also rigidly attached on the outer surface of each bearing 176 to limit the upper position of the axle 170, thus of the wheel 104, in the ski-engaging travel mode, as shown for instance in FIGS. 5 and 7.

The illustrated wheel-ski system 100 includes a positioning device 180 (FIGS. 2 and 3) mounted between the first lever arm 132 and the interior second lever arm 175. The purpose of the positioning device 180 is to provide a mechanical linkage so as to automatically set the axle 170 into the upper position when the supporting leg 120 is in the ski-engaging travel mode (FIGS. 1, 2, 5 and 7), and also to automatically set the axle 170 into the bottom position when the supporting leg 120 is in the wheel-engaging travel mode (FIGS. 3, 6 and 8). This way, the position of the wheel 104 always follows the angular position of the supporting leg 120.

In the illustrated example, as shown in FIGS. 2 and 3, the positioning device 180 includes a linkage assembly made of a plurality of mechanically interconnected components. One could also use a second actuator or the like to set the position of the wheel 104 independently of the main actuator 130. Other variants are possible.

The positioning device 180 of the illustrated example includes a lever unit 182 having a first end that is pivotally coupled to the back plate 122 at 209. This first end always remains at the same distance with reference to the first transversal pivot axis 200. The positioning device 180 also includes a lever member 184 having a first end rigidly attached to the lever unit 182 near its first end. The lever unit 182 and the lever member 184 define an obtuse angle with reference to one another.

Figure 9:
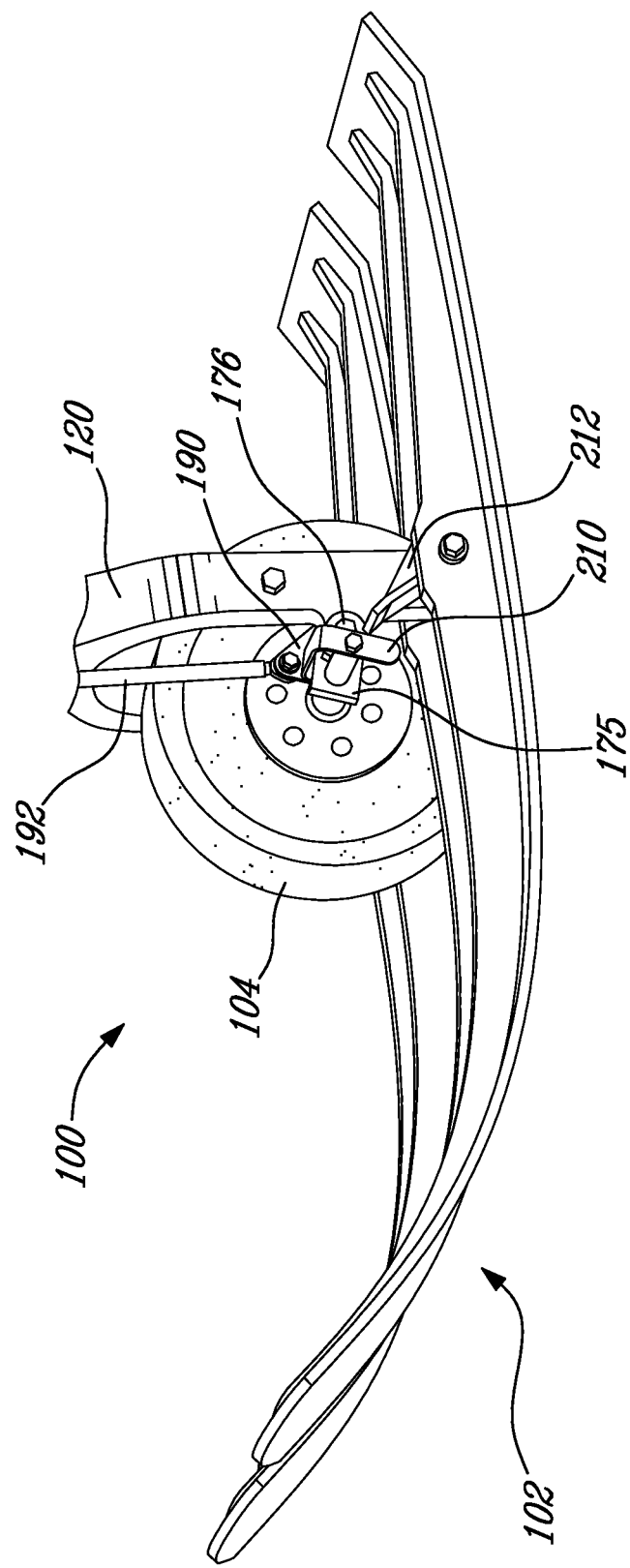
FIG. 9 is an isometric view of the left side of the right wheel-ski system shown in FIG. 1.

The second end of the lever unit 182 is pivotally connected to the first end of a first tie-rod 186. The opposite end of the first tie-rod 186 is pivotally connected to the first lever arm 132. The second end of the lever member 184 is pivotally connected to the first end, i.e. the upper end, of a second tie-rod 192. The opposite end, i.e. the bottom end, of the second tie-rod 192 is pivotally connected to a third lever arm 190 that is rigidly connected over the second lever arm 175 on the interior side of the wheel 104. The third lever arm 190 is best shown in FIG. 9. FIG. 9 is an isometric view of the left side, i.e. interior side, of the right wheel-ski system 100 shown in FIG. 1. The third lever arm 190 is also shown in FIGS. 7 and 8.

The first tie-rod 186 and/or the second tie-rod 192 can feature a length-adjustment device, threaded or not, so as to fine tune the positioning device 180. Variants are possible as well.

In use, pivoting the first lever arm 132 pivots the supporting leg 120 and this will also move the first tie-rod 186, causing the lever unit 182 to pivot as well. For instance, the transition between the first position (FIG. 2) and the second position (FIG. 3) will cause the lever unit 182 to rotate clockwise in the illustrated example. This pivots the lever member 184 and moves the second tie-rod 192 downwards, causing the interior second lever arms 175 to rotate and the wheel 104 to move towards its bottom position, thus to the wheel-engaging travel mode. Pivoting the supporting leg 120 in the opposite direction will move the wheel 104 towards its upper position.

The illustrated example is also configured and disposed to have the bottom end of the supporting leg 120 located in front of the first transversal pivot axis 200, with reference to the longitudinal axis of the vehicle 10, when the wheel-ski system 100 is set in the ski-engaging travel mode. Thus, the second transversal pivot axis will be forward of the first transversal pivot axis 200 and the weight of the vehicle 10 will tend to maintain the supporting leg 120 in this position, as best shown in FIG. 2. Moreover, when the wheel-ski system 100 is set in the wheel-engaging travel mode, the center of the axle 170 is configured and disposed to be at the rear of the first transversal pivot axis 200 with reference to the forward travel direction of the vehicle 10. Thus, the weight of the vehicle 10 will tend to keep the supporting leg 120 in this position since the center of the axle 170 will be slightly behind the center of rotation of the bearings 176 to mitigate the tendency of the axle 170 of moving upwards under the weight of the vehicle 10. FIG. 6 shows the distance D between the center of the axle 170 and the center of rotation the bearings 176 in the illustrated example. Variants are also possible.

The ski-engaging travel mode is generally the one during which the wheel-ski system 100 is subjected to the most intensive shocks, especially since the maximum travel speed of the vehicle 10 will often be higher than that of the wheel-engaging travel mode. While the actuator 130, the pads 126 and the vehicle's original suspension can absorb most of the shocks, some strong impacts between the ski 102 and obstacles on the snow-covered surface 106, for instance a rock, may cause the supporting leg 120 to pivot backwards for a brief moment and then cause the wheel 104 to engage the ground. This acts as an additional safety feature and will help the vehicle 10 to clear the obstacle. The normal ski-engaging travel mode will return automatically afterwards. Lowering the air pressure in the pneumatic actuator 130 of the illustrated example will influence the tendency of the wheel 104 to briefly engage the ground in the ski-engaging travel mode following an impact.

As aforesaid, the ski 102 is in an upper stowed position during the wheel-engaging travel mode, as shown for instance in FIG. 3. However, the pivot connection between the ski 102 and the bottom end of the supporting leg 120 can cause the front and/or the rear of the ski 102 to contact the road surface 108 when the vehicle 10 is in the wheel-engaging travel mode. This can be acceptable in some implementations but not in others. Therefore, if desired, one can provide a ski holder arrangement to automatically hold the ski 102 in a substantially horizontal position in the wheel-engaging travel mode. As best shown in FIGS. 5 and 6, each ski blade 102' of the illustrated example is provided with an example of such device. It includes an L-shaped lever 210 on each side of the wheel 104. Each lever 210 is rigidly attached to a corresponding one of the second lever arms 174, 175. The tip of each lever 210 is configured and disposed to engage the front side of a ski holder element 212 that is pivotally connected to side member 120' around the corresponding bushing assembly 172. When engaged by the lever 210, the back of the ski holder element 212 pushes against the upper side of a rubber pad 214 located inside a receptacle provided on the corresponding ski member 102', as best shown in FIG. 6. In the example, the ski blade 102' is heavier at the front.

Also, when the wheel-ski system 100 is in the ski-engaging travel mode, the ski holder element 212 of each ski blade 102' rests against a corresponding pin 216 so as to prevent it from pivoting too far at the front. The pin 216 is rigidly connected to the supporting leg 120. Variants are possible as well.

The wheel-ski system 100 can further include a locking arrangement for manually locking the wheel 104 in the bottom position in case of a failure of the actuator 130 or any related system, for instance the pneumatic system 140. The locking arrangement can include a bolt, on each side of the bearings, 176, to lock the second lever arm 174, 175 in position. Variants are possible as well.

Figure 10:
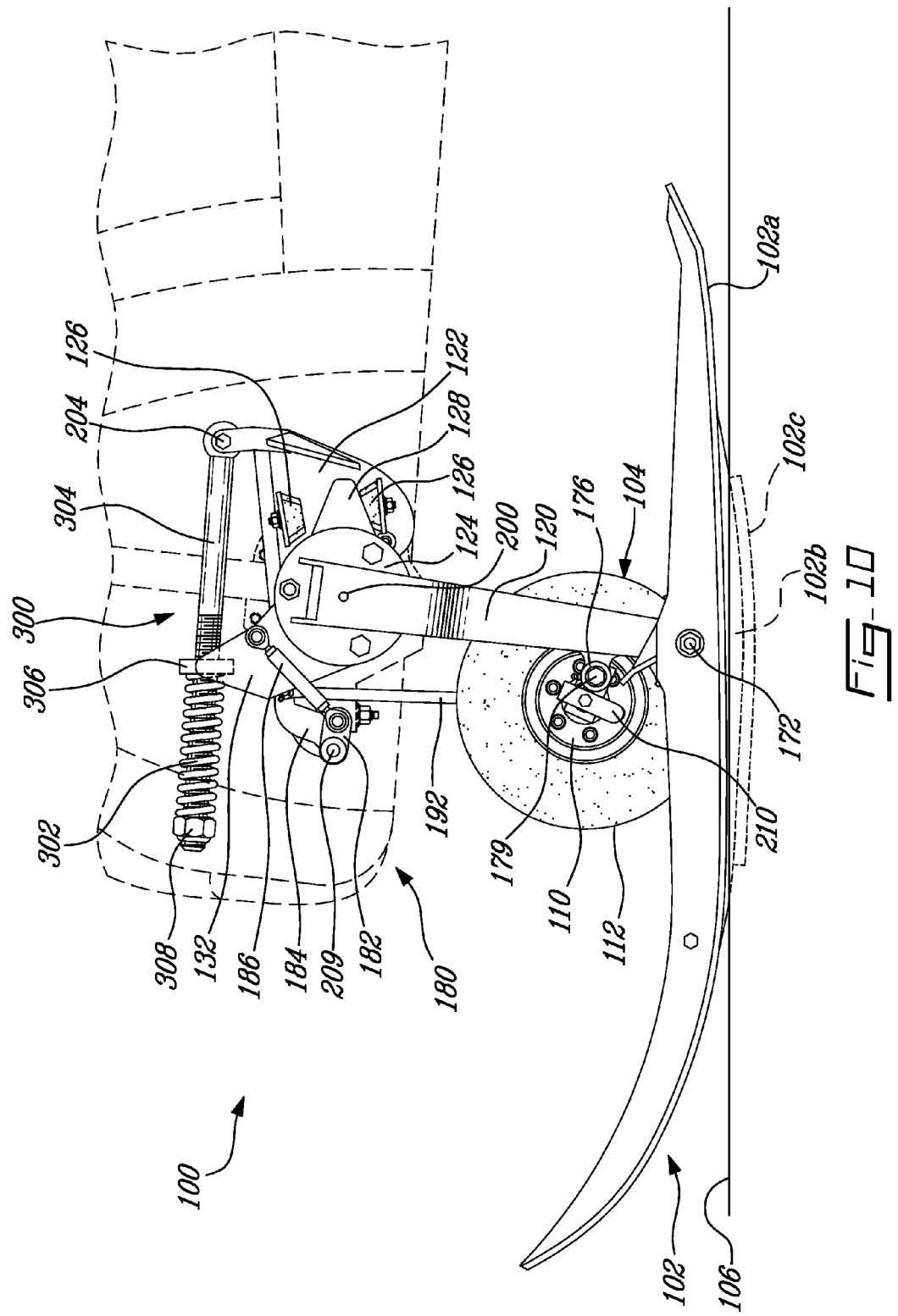
FIGS. 10 and 11 are views similar to FIGS. 2 and 3, respectively, but show an actuator having a compression spring therein.
Figure 11:
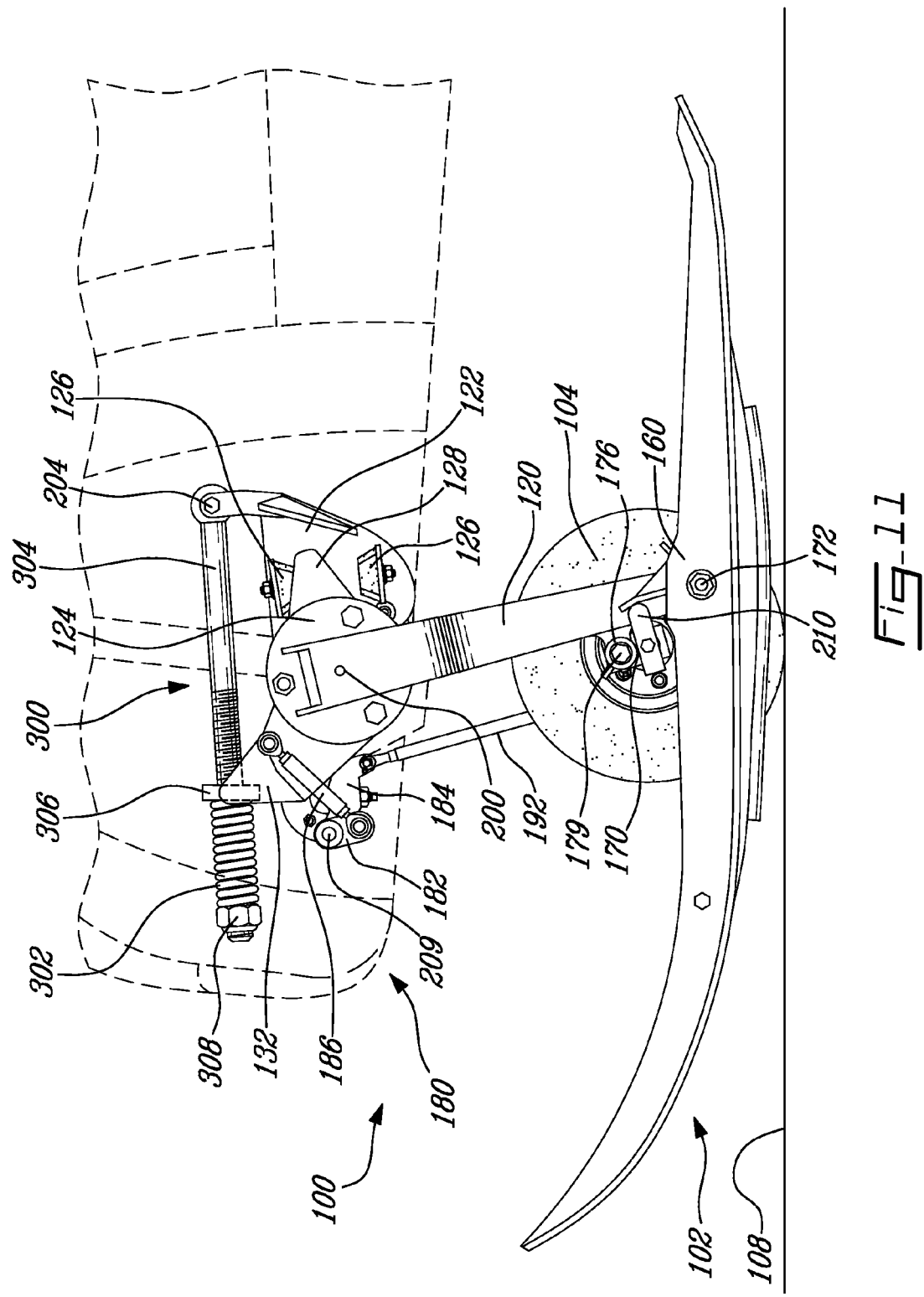

FIGS. 10 and 11 are views similar to FIGS. 2 and 3, respectively, but show an actuator 300 having a compression spring 302 coaxially mounted around a threaded stem 304. This actuator 300 replaces the pneumatic actuator 130 shown in FIGS. 2 and 3. The compression spring 302 is compressed between two parts, including a ring-shaped holder 306 that is welded or otherwise attached to the first lever arm 132. The second part is a nut 308 mounted on the threaded portion of the stem 304. The rear end of the stem 304 is pivotally coupled to the back plate 122 at 204. In use, the spring force urges the supporting leg 120 to move forward, i.e. towards its first position. The illustrated example shows an implementation where the driver (or another person) must force the supporting leg 120 to rotate using a handheld tool, for instance a wrench or the like, to change from the ski-engaging travel mode to the wheel-engaging travel mode, or vice-versa. The vehicle 10 must be stopped to make the transition. For instance, the wrench or the other tool can engage the head 179 of a bolt disposed on the outer side of the wheel-ski assembly 100. Pivoting the bolt head 179 will then pivot the second lever arms 174, 175. For instance, in FIG. 10, pivoting the bolt head 179 from the position as shown in a counterclockwise direction will force the second lever arms 174, 175 to rotate counterclockwise. The second lever arms 174, 175 will reach the position shown in FIG. 11.

In FIG. 11, the stem 304 is extended rearward with reference to the ring-shaped holder 306 and the wheel-ski system 100 is in the wheel-engaging travel mode. The weight of the vehicle 10 prevents the system 100 from going by itself to the ski-engaging travel mode.

As can be appreciated, the proposed concept provides a simple but yet efficient way of constructing and operating a wheel-ski system. With such system, crossing roads or travelling over a road surface will be simply a matter of changing the travel mode, which is something that can be done in less than a few seconds and possibly be done while the vehicle is still in motion.

The present detailed description and the appended figures are meant to be exemplary only, and a skilled person will recognize that many changes can be made while still remaining within the proposed concept.

What is claimed is:

1. A wheel-ski system for a vehicle adapted for travel in a forward travel direction on road and snow-covered surfaces, the system having a ski-engaging travel mode and a wheel-engaging travel mode, the system including:
    an elongated ski having a ground-engageable undersurface, the ski extending in a longitudinal direction, which longitudinal direction is substantially parallel to the forward travel direction;
    a back plate to be rigidly connected to the vehicle;
    a supporting leg having a top end and a bottom end, the top end of the supporting leg to be pivotally coupled to the vehicle about a first transversal pivot axis that is substantially orthogonal to the longitudinal direction, the supporting leg being pivotable about the first transversal pivot axis between a first position and a second position, the first position corresponding to the ski-engaging travel mode and the second position corresponding to the wheel-engaging travel mode, the bottom end of the supporting leg being pivotally coupled to the ski about a second transversal pivot axis that is substantially orthogonal to the longitudinal direction;
    a wheel having a ground-engageable outer surface;
    a first lever arm having opposite first and second ends, the first end of the first lever arm being in a torque-transmitting engagement with the supporting leg;
    an actuator mounted between the back plate and the first lever arm, the actuator at least generating a force urging the supporting leg to pivot towards its first position when the system is in the ski-engaging travel mode;
    a pair of second lever arms having opposite first and second ends, the first ends of the second lever arms being pivotally coupled to the supporting leg about a third transversal pivot axis that is substantially orthogonal to the longitudinal direction, the third transversal pivot being located above the ski and on a front side of the supporting leg with reference to the forward travel direction;
    a wheel-supporting axle around which the wheel is mounted for rotation, the wheel-supporting axle extending transversally between the second ends of the second lever arms and along a fourth transversal pivot axis that is substantially orthogonal to the longitudinal direction, the wheel-supporting axle being movable between an upper position and a bottom position, the upper position corresponding to the ski-engaging travel mode and the bottom position corresponding to the wheel-engaging travel mode; and
    a positioning device mounted between the first lever arm and one of the second lever arms, the positioning device positioning the wheel-supporting axle into the upper position when the supporting leg is in its first position, and positioning the wheel-supporting axle into the bottom position when the supporting leg is in its second position.

2. The wheel-ski system as defined in claim 1, wherein the back plate and the top end of the supporting leg are configured and disposed to be mounted to a corresponding steering knuckle arm of the vehicle.

3. The wheel-ski system as defined in claim 1, wherein the vehicle is a converted four-wheel vehicle having a right-side front steering knuckle arm and a left-side front steering knuckle arm cooperating with one another to steer the vehicle, the system being a first system provided on one among the two steering knuckle arms and a wheel-ski second system being provided on the other one among the two steering knuckle arms, the second system including a ski and a wheel that remain are substantially always parallel to the ski and the wheel of the first system.

4. The wheel-ski system as defined in claim 1, wherein the wheel includes a gas-inflated tire mounted around a rim.

5. The wheel-ski system as defined in claim 1, further including a pair of spaced-apart stoppers mounted on the back plate, one of the stoppers preventing the supporting leg from pivoting beyond its first position and the other one of the stoppers preventing the supporting leg from pivoting beyond its second position.

6. The wheel-ski system as defined in claim 5, wherein each of the stoppers include shock-absorbing pads, the shock-absorbing pads being engageable by a side lever that is made integral with and radially projecting from the top end of the supporting leg.

7. The wheel-ski system as defined in claim 1, wherein the first lever arm is made integral with and radially projecting from the top end of the supporting leg.

8. The wheel-ski system as defined in claim 1, wherein the ski includes two spaced-apart ski blades that are parallel to one another and the supporting leg has an inverted "Y" shape including two side members, each ski blade being pivotally connected to a bottom end of a corresponding one among two side members of the supporting leg.

9. The wheel-ski system as defined in claim 8, wherein the first ends of the second lever arms are each connected to a corresponding bearing positioned in front of a corresponding one among the two side members, each bearing including a casing having an outer circular front surface on which the wheel-supporting axle is engaged, the wheel-supporting axle rolling on the outer circular front surfaces when moving between its upper and bottom positions.

10. The wheel-ski system as defined in claim 8, further including a ski holder mounted between the ski and the supporting leg, the ski holder keeping the ski substantially horizontal when the system is in a wheel-engaging travel mode.

11. The wheel-ski system as defined in claim 10, wherein the ski holder includes two levers and two ski holder elements, each lever being attached to a corresponding one of the second ends of the second lever arms and each ski holder element being pivotally mounted around the second transversal pivot axis, each lever having a free end engaging a corresponding one of the ski holder element when the system is in a wheel-engaging travel mode.

12. The wheel-ski system as defined in claim 1, wherein in the first position of the supporting leg, the second transversal pivot axis is forward from the first transversal pivot axis with reference to the forward travel direction.

13. The wheel-ski system as defined in claim 1, wherein in the second position of the supporting leg, the second transversal pivot axis is rearward from the first transversal pivot axis with reference to the forward travel direction and the fourth transversal pivot axis is rearward from the third transversal pivot axis with reference to the forward travel direction.

14. The wheel-ski system as defined in claim 13, wherein in the second position of the supporting leg, the third transversal pivot axis is rearward from the first transversal pivot axis with reference to the forward travel direction.

15. The wheel-ski system as defined in claim 1, wherein the actuator includes a compression spring.

16. The wheel-ski system as defined in claim 15, wherein the actuator includes a nut to adjust spring force from the compression spring, the nut being coaxially mounted on a threaded stem around which the compression spring is mounted.

17. The wheel-ski system as defined in claim 1, wherein the actuator includes a piston and a cylinder, the piston being moveable inside a cylinder and having at least one side receiving a pressurized fluid.

18. The wheel-ski system as defined in claim 17, wherein the pressurized fluid is pressurized air, the wheel-ski system including a pneumatic system located on the vehicle.

19. The wheel-ski system as defined in claim 17, wherein the pressurized fluid is pressurized air, the wheel-ski system including a pneumatic system, the pneumatic system having a control valve, the supporting leg being selectively moveable between its first and second positions using the actuator and the control valve.

20. The wheel-ski system as defined in claim 1, wherein the actuator includes a piston, a cylinder and a pneumatic system, the piston being moveable inside a cylinder and having two sides receiving pressurized air, the actuator being configured to absorb shocks during operation of the wheel-ski system in the ski-engaging travel mode.

* * * * *